(12) United States Patent
Hasegawa

(10) Patent No.: US 8,582,205 B2
(45) Date of Patent: Nov. 12, 2013

(54) LENS BARREL AND OPTICAL APPARATUS INCLUDING THE SAME

(75) Inventor: Tomoki Hasegawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 869 days.

(21) Appl. No.: 12/688,373

(22) Filed: Jan. 15, 2010

(65) Prior Publication Data

US 2010/0182696 A1 Jul. 22, 2010

(30) Foreign Application Priority Data

Jan. 21, 2009 (JP) .................................. 2009-010536

(51) Int. Cl.
*G02B 27/14* (2006.01)
*G02B 7/02* (2006.01)
*H04N 5/228* (2006.01)
*G03B 17/00* (2006.01)

(52) U.S. Cl.
USPC .......... 359/557; 359/813; 348/208.99; 396/55

(58) Field of Classification Search
USPC ......... 359/557, 694, 814, 824, 813, 822, 823, 359/826, 554, 701, 704; 348/208.99, 208.7; 396/450, 483–485, 487, 505, 507, 463, 396/486, 490, 55
See application file for complete search history.

(56) References Cited

U.S. PATENT DOCUMENTS

| 5,774,266 A | 6/1998 | Otani et al. |
| 6,064,827 A | 5/2000 | Toyoda |
| 2003/0184878 A1* | 10/2003 | Tsuzuki ........................ 359/694 |

FOREIGN PATENT DOCUMENTS

| JP | 5-297443 A | 11/1993 |
| JP | 10-319465 A | 12/1998 |

* cited by examiner

*Primary Examiner* — Dawayne A Pinkney
(74) *Attorney, Agent, or Firm* — Rossi, Kimms & McDowell LLP

(57) ABSTRACT

The lens barrel has an image blur correction function for correcting an image blur, including: a movable member movable in a direction orthogonal to an optical axis while holding a lens and a driving magnet; and a fixed member for positioning the movable member in an optical axis direction and holding a driving coil and a magnetic member, in which: the driving magnet and the magnetic member constitute a driving portion for moving the movable member in the direction orthogonal to the optical axis; and in a plane orthogonal to the optical axis, a width of the magnetic member in a direction orthogonal to a direction of driving the movable member is larger than a width of the driving magnet in the direction orthogonal to the direction of driving the movable member.

8 Claims, 8 Drawing Sheets

LENS BARREL AND OPTICAL APPARATUS INCLUDING THE SAME

BACKGROUND OF THE INVENTION

1. Field of the Invention

The present invention relates to a lens barrel and an optical apparatus including the same, the lens barrel being suitable for driving a shift moving frame holding a lens for image blur correction so as to have a component in a direction orthogonal to an optical axis in order to correct an image blur due to vibration such as hand movements.

2. Description of the Related Art

In an optical apparatus such as a digital still camera and video camera, an image blur correction device has been used. Specifically, the image blur correction device detects hand movements of a user, and corrects a blur of a taken image (image blur).

In the image blur correction device, some optical elements for image blur correction (correction lens), which constitute an imaging lens, are driven in a pitch direction (longitudinal direction) and in a yaw direction (lateral direction).

With this configuration, a shift of a position of image formation due to hand movements is corrected. Thus, the image blur is cancelled (corrected).

In such image blur correction device, image blur correction may not be efficiently performed when a correction lens and a movable member (shift moving frame) movably supporting the correction lens rotate in a plane orthogonal to the optical axis.

Generally, a center of gravity of the movable member is situated at a position shifted from an axis in a direction of a thrust force generated from a driving portion for moving the movable member. Therefore, upon image blur correction, due to the thrust force, there is generated a rotational moment for rotating the movable member in the plane orthogonal to the optical axis. In addition, there is generated a force for rotating the movable member also due to vibration and friction other than the thrust force.

When the movable member is rotated in the plane orthogonal to the optical axis, the movable member may come in contact with a fixed member during image blur correction operation. As a result, driving properties of the movable member are changed, and hence the image is adversely affected.

Further, a position detection sensor for detecting a position of the movable member of the image blur correction device includes an optical sensor in many cases. The optical sensor includes a combination of a Hall element, a light emitting element, and a light receiving element, the Hall element including a combination of a magnet and a magnetic detection element. The position detection sensor is adapted for a movement of the correction lens in one of a yaw direction and a pitch direction in the plane perpendicular to the optical axis.

Here, the yaw direction is defined as a horizontal direction in the plane perpendicular to the optical axis in a posture of the camera in use. Meanwhile, the pitch direction is defined as a perpendicular direction in the plane perpendicular to the optical axis in a posture of the camera in use.

Thus, when the correction lens is rotated largely in the plane orthogonal to the optical axis, output properties of the position detection sensor are changed. As a result, it is impossible to correctly detect the position of the correction lens, and a so-called cross talk is generated. In addition, when a position detection property is changed due to rotation of the correction lens, feedback position control causes anomalous oscillation. Further, optical performance upon correction of hand movements is deteriorated.

In rotation of the correction lens within such an amount that the feedback position control is allowed, feedback position control can be performed in order to position the correction lens to a target position. However, the above-mentioned feedback position control leads an increased electric power consumption.

Conventionally, there has been known an image blur correction device. Specifically, in the image blur correction device, a correction lens held by a movable member is displaced in any one of a yaw direction and a pitch direction without being rotated about an optical axis (Japanese Patent Application Laid-Open No. H05-297443 and Japanese Patent Application Laid-Open No. H10-319465).

Japanese Patent Application Laid-Open No. H05-297443 discloses an image blur correction device provided with a guide shaft for regulating rotation. In addition, Japanese Patent Application Laid-Open No. H10-319465 discloses an image blur correction device in which rotation is prevented with a tension coil spring.

In the image blur correction device in Japanese Patent Application Laid-Open No. H05-297443, a gimbal structure is employed. With this structure, the correct lens is held by two guide shafts so as to be guided by the two guide shafts. Thus, the correct lens is allowed to move in any one of a yaw direction and a pitch direction, which are defined as two axial directions orthogonal to each other in the same plane. For image blur correction, response within a frequency band of several 10 Hz is needed, and also for position accuracy, high accuracy control is required. Therefore, it is essential to hold the correct lens with little friction and little backlash.

Therefore, In Japanese Patent Application Laid-Open No. H05-297443, in order to accurately displace the correction lens in the same plane, it is preferred that the two guide shafts be fitted into each other at two points. However, in order to hold those two guide shafts, which are fitted into each other at two points, without backlash but with high accuracy, a more complex structure is required.

In addition, in this structure, a rotational moment for rotating the movable member remains, and a torsion force is generated between the guide shafts and a bearing provided to the moving frame when the movable member is displaced. Therefore, it is difficult to satisfactorily maintain micro-amplitude properties.

In a lens shifting device of Japanese Patent Application Laid-Open No. H10-319465, a movable member holding a correction lens is supported in parallel to a plane perpendicular to the optical axis with at least three balls rotatably held by a fixed member. Further, by an elastic member provided for generating a pressing force for sandwiching the three balls between the movable member and the fixed member, rotation of the movable member about the optical axis is prevented.

In this case, rolling friction of the three balls is lower than sliding friction acting between a guide shaft and a bearing. Therefore, it is possible to satisfactorily maintain the micro-amplitude properties of the correction lens due to a friction of a mechanical mechanism.

In this case, when a center of the correction lens most frequently used is situated in vicinity of the optical axis, if, in a driving direction of the movable member, a force from the elastic member is not applied uniformly to the movable member from both sides, the force from the elastic member acts as a load. As a result, the electric power consumption increases. In addition, a unit for uniformly applying, in the driving direction of the movable member, the force from the elastic member to the movable member is required.

Meanwhile, in recent years, an image pickup element (charge coupled device (CCD) and complementary metal oxide semiconductor (CMOS)) for converting a subject image, which is formed by means of an photographic optical system, into an electrical signal has a shorter pixel pitch by grace of development of a semiconductor micro-processing technology. Moving amount of a shift lens group for correcting hand movements having the same amount is substantially proportional to an image pickup area. For this reason, when the pixel pitch of the image pickup element is shorter, it is more difficult to satisfactorily correct the image blur without more micro movement having a higher accuracy.

SUMMARY OF THE INVENTION

The present invention has an object to provide a lens barrel provided with an image blur correction device, and an optical apparatus including the lens barrel, the lens barrel being capable of restricting rotation of a correction lens about an optical axis, and being further capable of correcting an image blur with a little electric power consumption.

According to the present invention, it is possible to obtain a lens barrel provided with an image blur correction device, and an optical apparatus including the lens barrel, the lens barrel being capable of restricting rotation of a correction lens about an optical axis, and being further capable of correcting the image blur with a little electric power consumption.

According to the invention, there is provided a lens barrel having an image blur correction function for correcting an image blur, comprising: a movable member movable in a direction orthogonal to an optical axis while holding a lens and a driving magnet; and a fixed member for positioning the movable member in an optical axis direction and holding a driving coil and a magnetic member, wherein: the driving magnet, the driving coil, and the magnetic member constitute a driving portion for moving the movable member in the direction orthogonal to the optical axis; and in a plane orthogonal to the optical axis, a width of the magnetic member in a direction orthogonal to a direction of driving the movable member is larger than a width of the driving magnet in the direction orthogonal to the direction of driving the movable member.

According to the present invention, there is also provided a lens barrel, wherein: the driving portion comprising: a first driving portion for driving the movable member in the plane orthogonal to the optical axis in a first direction; and a second driving portion for driving the movable member in the plane orthogonal to the optical axis in a second direction orthogonal to the first direction, wherein, in the plane orthogonal to the optical axis, the width of the magnetic member in the direction orthogonal to the direction of driving the movable member constituting each of the first driving portion and the second driving portion is larger than the width of the driving magnet in the direction orthogonal to the direction of driving the movable member.

According to the present invention, there is also provided a lens barrel, wherein the relation A≥(2×d+B) is obtained, where d (mm) represents a maximum movable distance of the movable member, A (mm) represents the width of the magnetic member in the direction orthogonal to the direction of driving the movable member, and B (mm) represents the width of the driving magnet in the direction orthogonal to the direction of driving the movable member.

According to the present invention, there is also provided an optical apparatus, comprising: the lens barrel; and an image pickup element.

According to the present invention, there is also provided a lens barrel having an image blur correction function for correcting an image blur, comprising: a movable member movable in a direction orthogonal to an optical axis while holding a lens, a driving coil, and a magnetic member; and a fixed member for positioning the movable member in an optical axis direction and holding a driving magnet, wherein: the driving magnet, the driving coil, and the magnetic member constitute a driving portion for moving the movable member in the direction orthogonal to the optical axis; and in a plane orthogonal to the optical axis, a width of the driving magnet in a direction orthogonal to a direction of driving the movable member is larger than a width of the magnetic member in the direction orthogonal to the direction of driving the movable member.

According to the present invention, there is also provided a lens barrel, wherein: the driving portion comprising: a first driving portion for driving the movable member in the plane orthogonal to the optical axis in a first direction; and a second driving portion for driving the movable member in the plane orthogonal to the optical axis in a second direction orthogonal to the first direction, wherein, in the plane orthogonal to the optical axis, the width of the driving magnet in the direction orthogonal to the direction of driving the movable member constituting each of the first driving portion and the second driving portion is larger than the width of the magnetic member in the direction orthogonal to the direction of driving the movable member.

According to the present invention, there is also provided a lens barrel, wherein the relation A≥(2×d+B) is obtained, where d (mm) represents a maximum movable distance of the movable member, A (mm) represents the width of the magnetic member in the direction orthogonal to the direction of driving the movable member, and B (mm) represents the width of the driving magnet in the direction orthogonal to the direction of driving the movable member.

According to the present invention, there is also provided an optical apparatus, comprising: the lens barrel; and an image pickup element.

Further features of the present invention will become apparent from the following description of exemplary embodiments with reference to the attached drawings.

DESCRIPTION OF THE EMBODIMENTS

Examples of the present invention are described in detail with reference to the drawings.

A lens barrel according to the present invention includes a lens for vibration isolation, driving magnets, and a movable member. The movable member is movable in a direction perpendicular to an optical axis, while holding the driving magnets. Further, the lens barrel according to the present invention includes multiple balls and a fixed member. The multiple balls are for positioning the movable member in a direction of the optical axis. The fixed member is for positioning the multiple balls in the direction of the optical axis, and holding a driving coil and a magnetic member.

The driving magnets and the magnetic member constitute a driving portion for moving the movable member in a plane orthogonal to the optical axis.

The multiple balls are rotatably sandwiched due to a magnetic attraction force between the driving magnets and the magnetic member.

A width in a direction orthogonal to a direction in which the movable member is driven by the magnetic member is set to be larger than a width in a direction orthogonal to a direction in which the movable member is driven by the driving magnets.

By energizing the driving coil, the driving portion is driven so as to cause the movable member to move. In this manner, an image blur is corrected.

First Example

Figure 1:
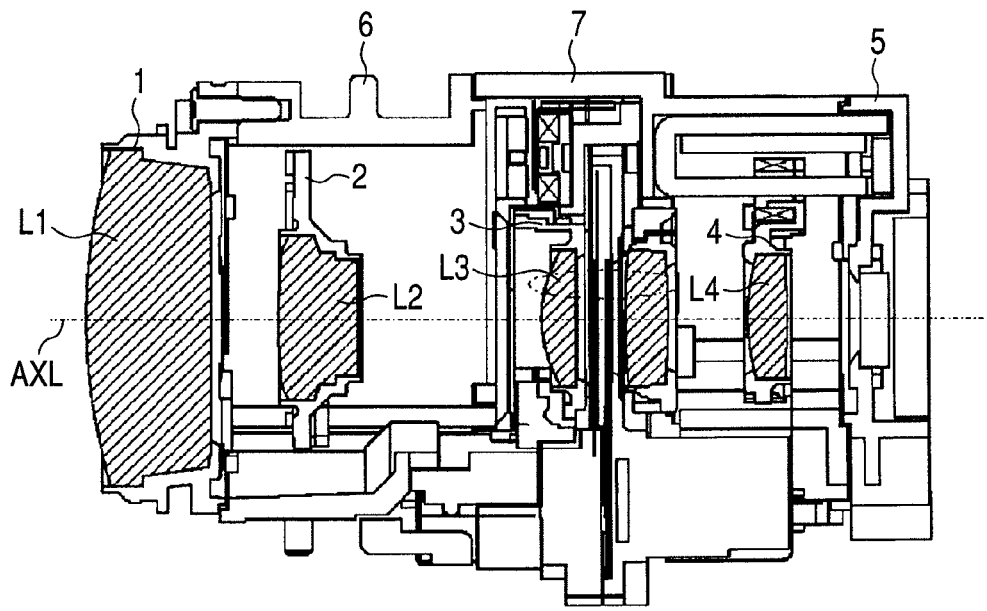
FIG. 1 is a sectional view of main parts, which illustrates a structure of a lens barrel in a first example according to the present invention.
Figure 2:
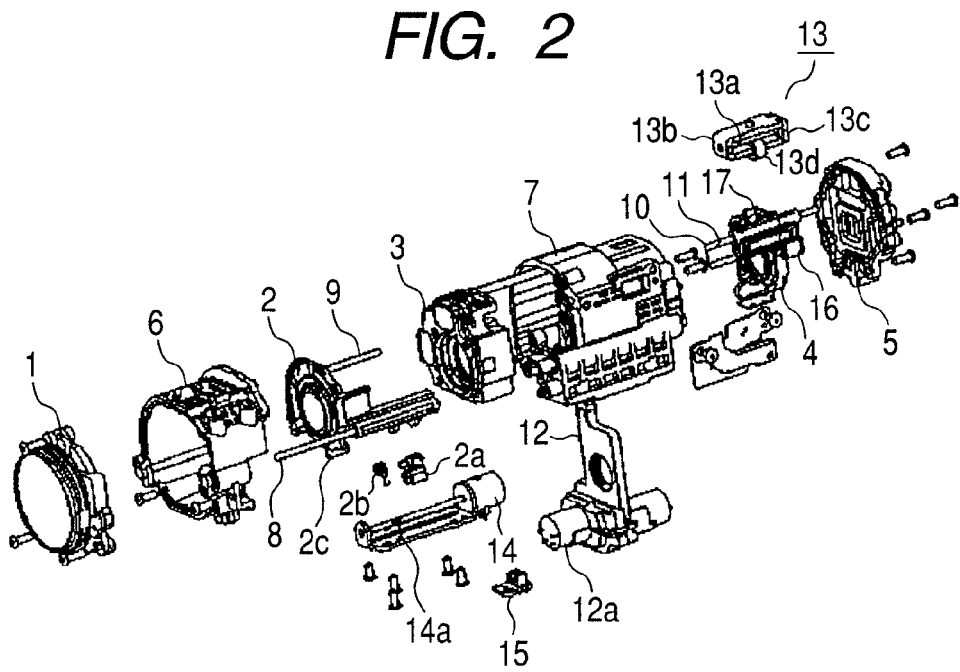
FIG. 2 is an exploded perspective view of the lens barrel in the first example according to the present invention.

FIG. 1 illustrates a sectional view of a lens barrel provided with an image blur correction device according to a first example. FIG. 2 illustrates an exploded perspective view of the lens barrel of FIG. 1. Note that, the lens barrel is attached to an imaging apparatus such as a video camera or a digital still camera, or otherwise, the lens barrel is integrally provided to such imaging apparatus for use.

The lens barrel includes a variable magnification optical system (zoom lens) having a four-group structure including lens groups having positive, negative, positive, and positive refractive indexes. That is, the lens barrel includes: a first group lens L1 fixed (immobile) in the optical axis direction; and a second group lens L2 for variable magnification. Further, the lens barrel includes: a third group lens L3 for image blur correction; and a fourth group lens L4 which moves for variable magnification and for focusing.

The second group lens L2 moves in the optical axis direction, and performs variable magnification operation. The third group lens L3 acts as a movable optical element for vibration isolation. Specifically, the optical element for vibration isolation moves in a direction orthogonal to the optical axis, that is, in a longitudinal direction and a lateral direction to be described later, and performs blur correction (image blur correction). The fourth group lens L4 moves in the optical axis direction, and performs correction action and focusing action of an image surface which varies depending on variable magnification.

The first group lens L1 is held by the fixed lens barrel 1. The second group lens L2 is held by a second-group moving frame 2. The third group lens L3 is held by a shift unit 3. The fourth group lens L4 is held by a fourth-group moving frame 4.

In addition, on a rear side (image side) of the fourth-group moving frame 4, there is provided a CCD holder 5 for fixing an image pickup element including a CCD. The lens barrel 1 is fixed to a forward fixed lens barrel 6 with vises. The CCD holder 5 and the forward fixed lens barrel 6 are fixed to a rearward fixed lens barrel 7 with vises.

The second-group moving frame 2 is movably supported in the optical axis direction by guide bars 8 and 9. The guide bars 8 and 9 are positioned and fixed by the forward fixed lens barrel 6 and the rearward fixed lens barrel 7. In addition, the fourth-group moving frame 4 is movably supported in the optical axis direction by guide bars 10 and 11. The guide bars 10 and 11 are positioned and fixed by the CCD holder 5 and the rearward fixed lens barrel 7.

The shift unit 3 is positioned with respect to the rearward fixed lens barrel 7 and is fixed with two vises. An aperture stop device 12 arranged in the third group lens L3 employs a so-called guillotine system. Specifically, in the guillotine system, a diameter of an opening of a variable magnification optical system is changed, and two aperture blades are moved in an opposite direction to each other to thereby change the diameter of the opening.

An aperture motor 12a of the aperture-stop device 12 includes a galvanometer.

The fourth group lens L4 is driven in the optical axis direction by a voice coil motor 13. The voice coil motor 13 includes a magnet 13a, a yoke 13b, a yoke 13c, and a coil 13d. In the voice coil motor 13, the yoke 13b is pressed-fitted into and fixed to the rearward fixed lens barrel 7. The magnet 13a and the yoke 13c are magnetically fixed to yoke 13b. By supplying an electrical current to the coil 13d, a Lorentz force is generated in the coil 13d. Thus, the coil 13d may be driven in the optical axis direction. The coil 13d is fixed to the fourth-group moving frame 4, and hence the fourth-group moving frame 4 is driven in the optical axis direction due to driving of the coil 13d.

A zoom motor 14 is fixed to the rearward fixed lens barrel 7 with two vises. The second group lens L2 is driven in the optical axis direction by the zoom motor (stepping motor) 14 and performs variable magnification operation. The zoom motor 14 includes a rotating rotor and a lead screw 14a which is coaxial with the rotating rotor. A rack 2a provided to the second-group moving frame 2 is mated to the lead screw 14a. Thus, the second group lens L2 is driven in the optical axis direction due to rotation of the rotor. In addition, a backlash of each of the guide bars 8 and 9, the rack 2a, and the lead screw 14a is compensated by a helical torsion coil spring 2b. In this manner, a backlash due to fitting or mating is prevented.

A photo interrupter 15 is used as a zoom reset switch. Specifically, the zoom reset switch optically detects a movement of a light-shielding portion 2c to the optical axis direction, the light-shielding portion 2c being formed in the second-group moving frame 2. Thus, it is detected that the second group lens L2 is positioned at a reference position.

An encoder (optical sensor) 16 fixed to the rearward fixed lens barrel 7 includes a light emitting portion and a light receiving portion. The encoder 16 irradiates a light, which is emitted from the light emitting portion, to a scale 17 adhesively fixed to the fourth-group moving frame 4. Then, a reflected light is read in the light receiving portion. In this manner, an absolute position of the fourth group lens L4 in the optical axis direction is detected.

Figure 3:
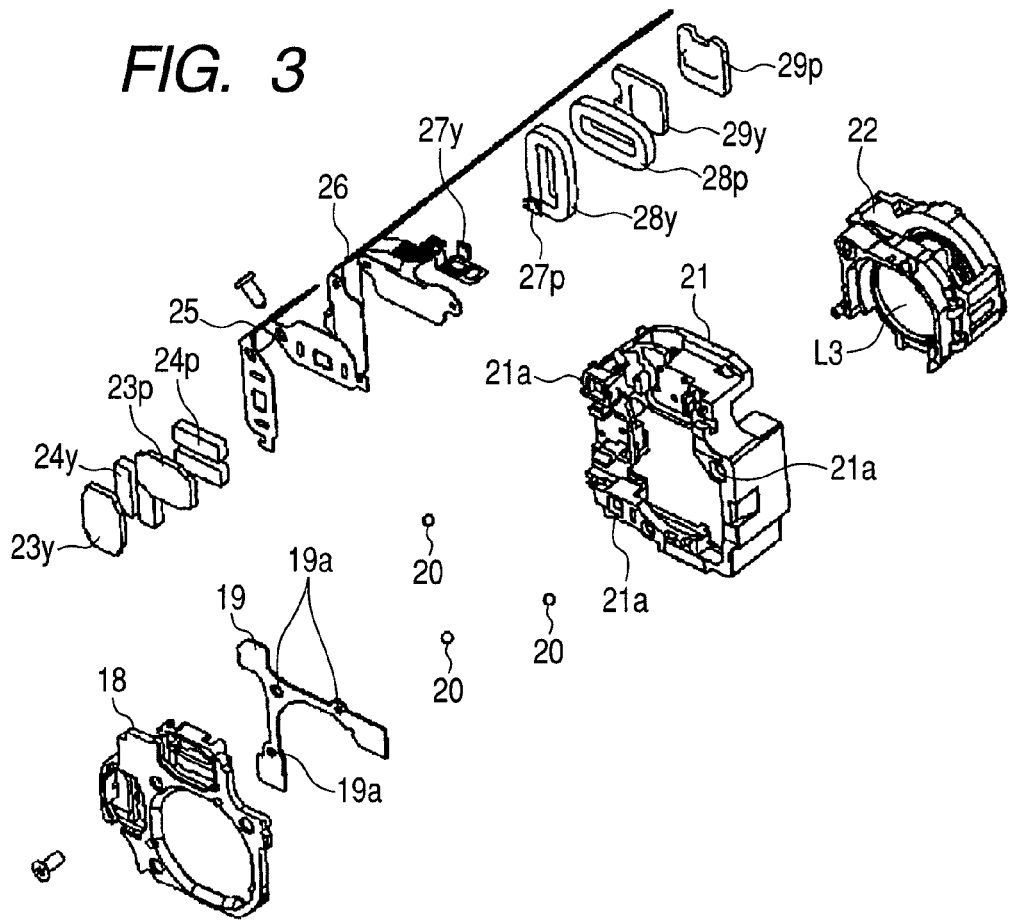
FIG. 3 is an exploded perspective view of a shift unit in the first example according to the present invention.
Figure 4:
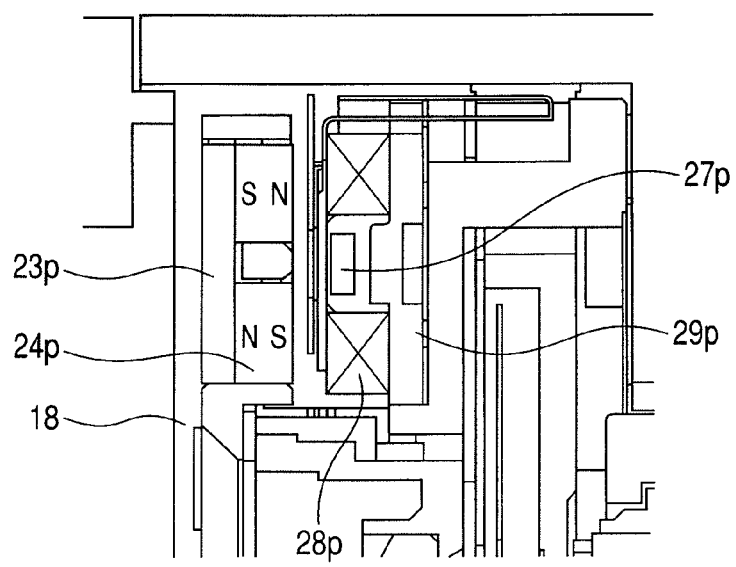
FIG. 4 is an enlarged view of a shift driving portion in the first example according to the present invention.

Next, a structure of the shift unit 3 for moving the third group lens L3 in a direction orthogonal to the optical axis direction is described with reference to FIGS. 3 and 4. FIG. 3 is an exploded perspective view of a shift unit 3. FIG. 4 is an enlarged sectional view of a driving portion in a pitch direction (longitudinal direction) of the shift unit 3.

The shift moving frame 22 for holding the third group lens L3 is driven by an actuator for longitudinal drive. The actuator is for correcting the image blur due to angular change in the pitch direction, that is, in the longitudinal direction of the lens barrel or in the longitudinal direction in the imaging direction. Further, the shift moving frame 22 holding the third group lens L3 is driven in the plane orthogonal to the optical axis direction by an actuator for a lateral drive. The actuator is for correcting the image blur due to angular change in the yaw direction, that is, in the lateral direction of the lens barrel or in the lateral direction in the imaging direction.

Figure 8:
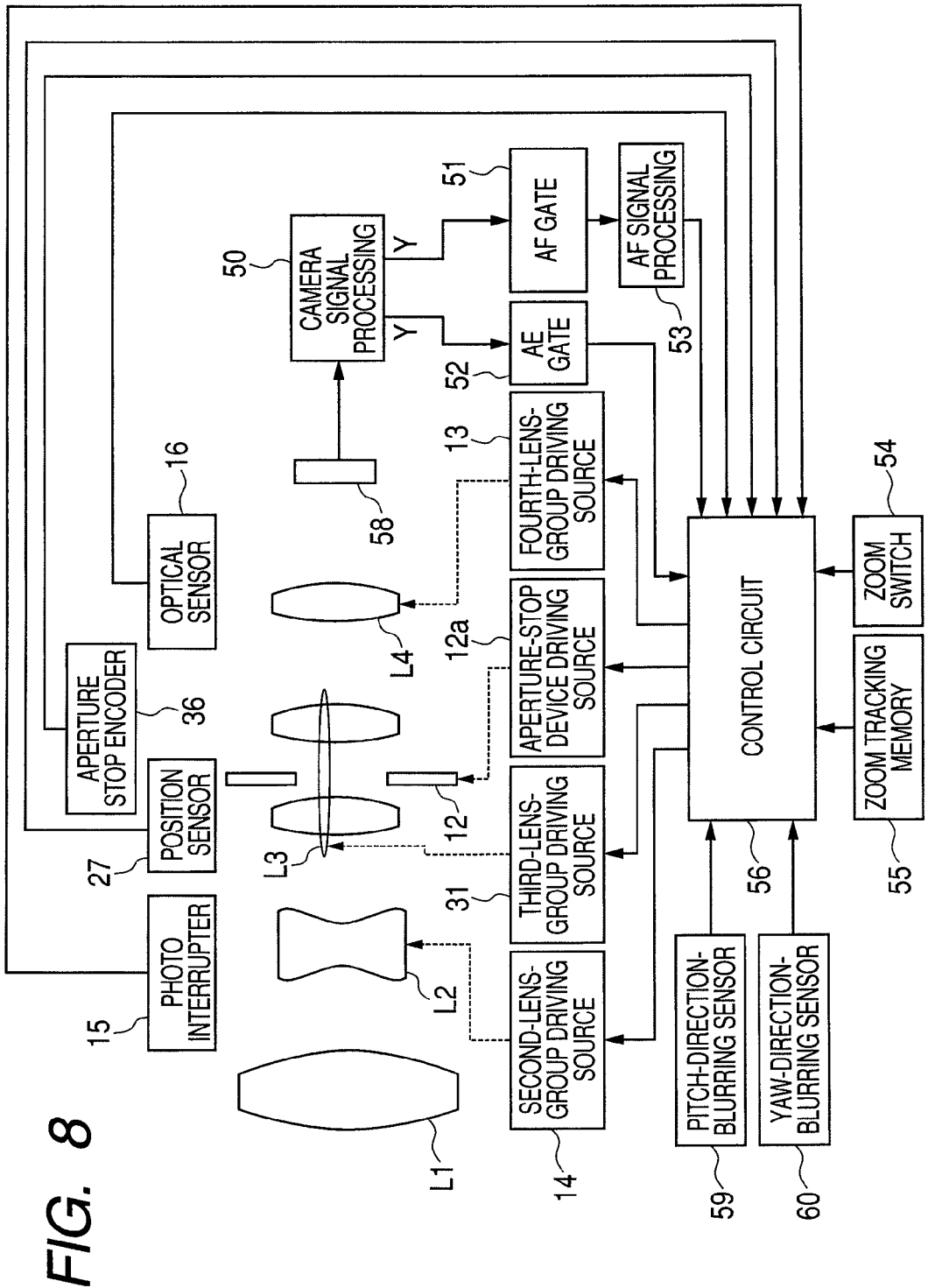
FIG. 8 is a block diagram illustrating a structure of an electric circuit of a camera installing therein a lens barrel capable of correcting an image blur in a second example according to the present invention.

In an optical apparatus such as a camera, as illustrated in FIG. 8, there are installed a pitch-direction-blurring sensor 59 and a yaw-direction-blurring sensor 60, such as a vibratory gyroscope. The pitch-direction-blurring sensor 59 is for detecting angular change in the pitch direction. The yaw-direction-blurring sensor 60 is for detecting angular change in the yaw direction (lateral direction).

A control circuit (such as CPU responsible for controlling the entire of the optical apparatus) 56 controls each of the actuators based on output from the blurring sensors 50 and 60 and on signals from a position sensor (to be described later) for detecting the position in the plane orthogonal to the optical axis direction of the third group lens L3. Note that, each of the actuators is independently driven and controlled in the pitch direction and the yaw direction.

In addition, the actuator and the position sensor for the pitch direction, and the actuator and the position sensor 60 for the yaw direction are arranged so as to form an angle of 90° with each other and have the same structure. Therefore, in the following, the description is made only regarding the pitch direction (longitudinal direction). Note that, suffixes p and y of the reference symbols indicates the pitch direction and the yaw direction, respectively.

The shift moving frame 22 has a function for holding the third group lens L3 and displaces in the direction orthogonal to the optical axis direction in order to correct the image blur.

Magnets 24p for both drive and position detection is press-fitted into and held by a magnet base 18 in the direction orthogonal to the optical axis direction. The magnets 24p are press-fitted and incorporated into the magnet base 18, and hence a relative position relation between the magnet base 18 and the magnets 24p is not changed.

The magnet base 18 and the shift moving frame 22 is coupled and fixed to each other with a vis in a state in which a metal plate 19 is sandwiched therebetween. The metal plate 19, the magnet base 18, and the shift moving frame 22 constitute one element of the movable member. The magnets 24p, which also have a function of position detection, is positioned at a position fixed with respect to the shift moving frame 22 holding the third group lens L3. Thus, it is possible to accurately detect the position of the third group lens L3 by the magnets 24p.

It is suitable that the metal plate 19 is made of a stainless steel, for example.

Between the shift base 21 and the magnet base 18, three balls 20 are arranged in the plane orthogonal to the optical axis direction. Note that, it is sufficient that multiple balls 20 are provided. Between the balls 20 and the magnet base 18, the above-mentioned metal plate 19 is arranged. With this metal plate 19, when the lens barrel receives some impact, the balls 20 are not bumped on the magnet base 18, which is a molded component, and hence there are not formed a marks of the balls in the magnet base 19. Thus, this metal plate 19 prevents driving properties of the shift unit 3 from being deteriorated. In addition, the balls 20 are, due to magnetic attraction force of the magnets 24 for drive and a magnetic member 29p, rotatably held by a ball holder portion 21a formed in the shift base (fixed member) 21.

Note that, it is suitable that the balls 20 are made of a stainless steel so as not to be attracted to the magnet 24 arranged in vicinity of the balls.

The magnets 24p for drive and the magnetic member 29p constitute one element of the driving portion.

It is an attraction force acting between the magnets 24p and a rear yoke 29p (driving portion) that is for securely abutting the balls 20 against the shift base (end surface in the optical axis direction of the ball holder 21a) and the magnet base 19 (metal plate 19). With this attraction force, the magnet base 18 is biased toward the shift base 21. As a result, the three balls 20 are abutted against the end surface in the optical axis direction of the three ball holder portions 21a and against three points 19a of the metal plate 19, in a pressed state.

Each of the surfaces of the metal plate 19, against which the three balls 20 are abutted, extends in the direction orthogonal to the optical axis direction AXL of the photographic optical system. Nominal diameters of the three balls 20 are the same, and hence differences of positions of the three ball holders 21a provided to the shift base 21 in the optical axis direction between the end surfaces of the optical axis direction are kept being small. With this structure, it is possible to move the third group lens L3 held by the shift moving frame 22 in the plane orthogonal to the optical axis direction without causing the third group lens L3 to be tilted with respect to the optical axis.

Figure 5:
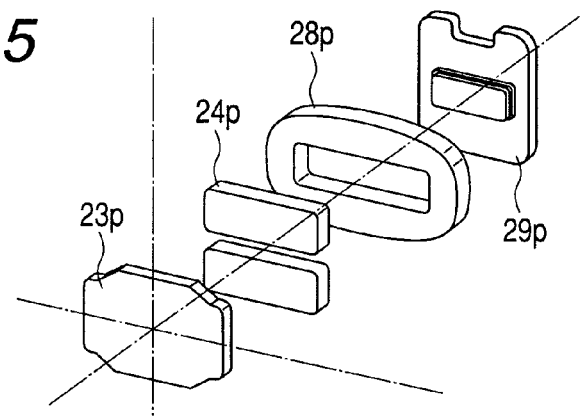
FIG. 5 is a view illustrating a structure of a driving portion in the first example according to the present invention.

Next, the actuator for driving the shift moving frame 22 for holding the magnet base 18 and the third group lens L3 is described. As describe above, the magnets 24p have, as illustrated in FIG. 5, two magnetic poles in a radial direction from the optical axis AXL. The rear yoke 23p is for closing a magnetic flux on a front side of the magnets 24p in the optical axis direction. The rear yoke 23p is attracted and fixed to the magnets 24p. The coil 28p is adhesively fixed to the shift base 21. The rear yoke (magnetic member) 29p is for closing a magnetic flux on a rear side of the magnets 24p in the optical axis direction.

The rear yoke 29p is arranged on an opposite side to the magnets 24p while sandwiching the coil 28p, and the rear yoke is held by the shift base 21. A magnetic circuit is formed by the magnets 24p, the front yoke 23p, the rear yoke 29p, and the coil 28p.

By supplying an electrical current to the coil (coil for drive) 28d, a Lorentz force is generated in a direction substantially orthogonal to a magnetic boundary of the magnets 24p due to mutual repulsion of a magnetic line of flux generated in the magnets 24p and the coil 28p. Thus, the magnet base 18 is caused to move in the direction orthogonal to the optical axis direction. This is a so-called moving magnet type actuator (driving portion).

Actuators (driving portion) having such structure are arranged in the longitudinal direction and the lateral direction. Therefore, it is possible to drive the magnet base 18 and the shift moving frame 22 coupled to the magnet base 18 in two directions orthogonal to the optical axis direction, the two directions being substantially orthogonal to each other. Further, by combining drive in the longitudinal direction with drive in the lateral direction, it is possible to freely move the magnet base 18 and the shift moving frame 22 in a plane orthogonal to the optical axis direction within a predetermined range.

Note that, a friction when the magnet base 18 acts in the direction orthogonal to the optical axis direction is only a rolling friction each generated between the balls 20 and the metal plate 19 and between the balls 20 and the ball holder portions 21a as long as the balls 20 are abutted against a wall of the ball holder portions 21a. Therefore, despite acting of the above-mentioned attraction force, the magnet base 18 (that is, the shift moving frame 22 holding the third group lens L3) is capable of very smoothly moving in the plane orthogonal to the optical axis direction, and it is possible to control even a micro amount of the movement. Note that, by applying a lubricating oil to the balls 20, it is possible to further reduce the frictional force.

Next, a position detection of the magnet base 18 and the shift moving frame 22 holding the third group lens L3 is described. A Hall element 27p for converting a magnetic flux density into an electrical signal is fixed to a flexible print cable (hereinafter, referred to as FPC) 26 by soldering. The FPC 26 is positioned and fixed with respect to the shift base 21. In addition, by fixing a supporting metal piece 25 with respect to the shift base 21 with a vis, the FPC 26 is prevented from being lifted up, and a position of the Hall element 27p is prevented from being shifted. With the following structure, a position sensor for detecting the position of the shift moving frame 22 holding the magnet base 21 and the third group lens L3 is formed.

When the shift moving frame 22 holding the magnet base 18 and the third group lens L3 is driven in one of the longitudinal direction and the lateral direction, a change of the magnetic flux density of the magnets 24p is detected by the Hall element 27p. Then, an electrical signal indicating the change of the magnetic flux density is output. According to the Hall element 27p, a control circuit 56 is capable of detecting the position of the shift moving frame 22 holding the magnet base 18 and the third group lens L3. Note that, the magnets 24p are magnets for drive, and the magnets 24p are used also as magnets for position detection at the same time.

Here, a structure of the driving portions 23p, 24p, 28p, and 29p in this example is described.

FIG. 5 illustrates a structure of the driving portion in this example. The magnets 24p, the front yoke 23p, the coil 28p, and the rear yoke 29p have a symmetrical shape with respect to a center of the driving portion so that a direction of a driving force of the driving portion is one direction of the pitch direction and the yaw direction.

Figure 6A:
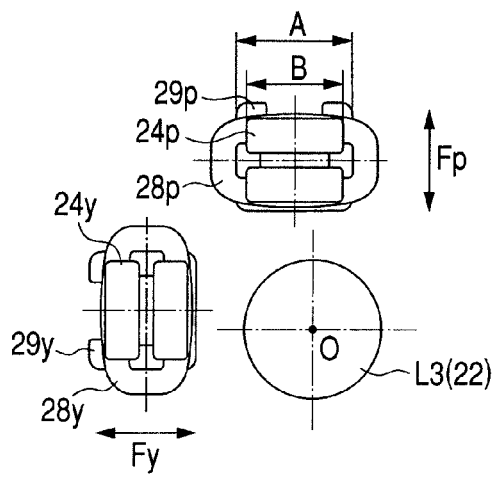
FIG. 6A is a view illustrating an arrangement of an image blur correction lens and the driving portion in a center position, in a first example according to the present invention.
Figure 6B:
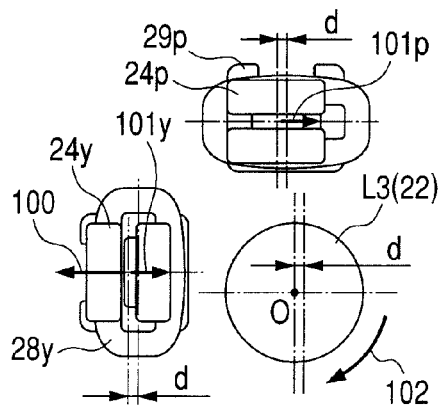
FIG. 6B is a view illustrating a relation of a force acting on the shift unit upon image blur correction.
Figure 6C:
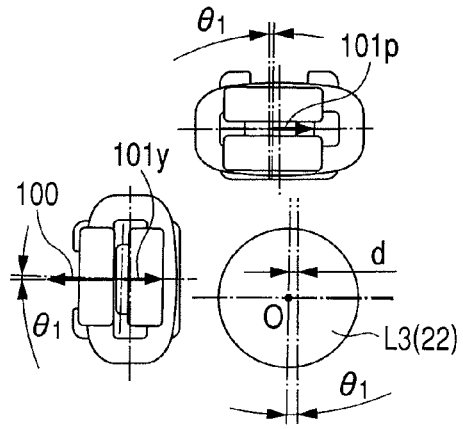
FIG. 6C is a view illustrating a balancing state of a rotational moment.

Next, a relation of movement and rotation due to a returning force generated by the attraction force, of the movable member (shift moving frame) 22 in this example is illustrated in FIGS. 6A to 6C.

FIG. 6A illustrates an arrangement of the coils (28p and 28y) and the rear yokes 29 (29p and 29y) on a fixing side in a state in which the third group lens L3, which is supported by the movable member 22, and the magnets 24 (24p and 24y) are situated at a center position.

A center O of the third group lens L3 is situated on the optical axis. The attraction force acting between the magnets 24 and the rear yokes 29 is proportional to the inverse of the square of a strength of magnetic charge of two objects and distance between the two objects, as described by Coulomb's law. Therefore, if each of the magnets 24 and the rear yokes 29 have a symmetrical shape with respect to the center of the driving portion, when the magnets 24 are situated at the center position of the driving portion, the attraction force in the pitch direction (Fp) and the attraction force in the yoke direction (Fy) are balanced in each of the directions. In addition, when the magnets 24 are moved from the center of the driving portion, a magnetic charge increases in an opposite direction to a moving direction. Thus, attraction force for returning the magnets 24 to the center of the driving portion is generated.

Note that, in FIG. 6A, the magnets 24p, the coil 28p, and the rear yoke 29p constitute a perpendicular driving portion for moving the movable member in a perpendicular direction Fp.

In addition, the magnets 24y, the coil 28y, and the rear yoke 29y constitute a horizontal driving portion for moving the movable member in a horizontal direction Fy.

FIG. 6B illustrates a relation of a driving force and an attraction force when the movable member 22 is displaced in the yaw direction from the state of FIG. 6A. When the movable member 22 is displaced in the yaw direction, by supplying an electrical current to the coil 28y, a Lorentz force is generated from the coil 28y. Due to the Lorentz force, a thrust force 100 for driving the movable member 22 in the yaw direction is generated. Due to the thrust force 100, the movable member 22 is moved by a distance d.

In this case, the magnets 24 (24p and 24y) arranged in the movable member 22 are also moved by the distance d from the center position of the driving portion. Thus, returning forces 101p and 101y are generated, with which the magnets 24 returns to their original positions with the attraction force.

Upon the above-mentioned action, the thrust force 100 and the returning force 101y act on the identical axis to an axis of a thrust force direction, while the returning force 101 acting on the driving portion in the pitch direction is not on the identical axis to that of the thrust force 100. Thus, a rotational moment 102 for rotating the movable member with the thrust force 100 and the returning force 101p is generated.

FIG. 6C illustrates a state in which the rotational moment due to the thrust force 100 and the returning force 101p of FIG. 6B is balanced. The center point O of the third group lens L3 is moved from the optical axis in the yaw direction by the distance d, and the movable member 22 is rotated by a rotational angle θ1 in the plane orthogonal to the optical axis. In this case, a rotational direction in the plane orthogonal to the optical axis is in a stable state because the thrust force 100 and the returning force 101p are balanced. Thus, even when an additional force in the rotational direction acts, the force for returning to the position of the rotational angle θ1 is generated.

In FIG. 6A, a reference symbol A indicates a longitudinal dimension of the rear yoke (magnetic member) 29p, and a reference symbol B indicates a longitudinal dimension of the magnets 24p. In this example, supposed that the distance d is a maximum movable distance of the movable member 22 in one direction from the optical axis, a dimensional relation between the width A of the magnetic member 29p and the width B of the magnets for drive 24p is set as follows:

$$A \geq (2 \times d + B).$$

That is, the width A (mm) is set to be larger than the width B (mm).

With this setting, even when the movable member 22 is displaced in the yaw direction by the maximum amount, as illustrated in FIG. 6B, the magnets 24p is not moved on a left side over the rear yoke 29p.

In this example, the width A is set to be larger than the width B in the yaw direction and the pitch direction.

Figure 9A:
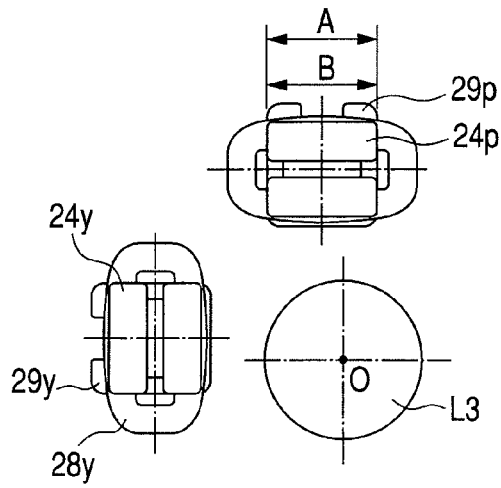
FIG. 9A is a view illustrating an arrangement of an image blur correction lens and a driving portion in a center position, in an example of prior art.
Figure 9B:
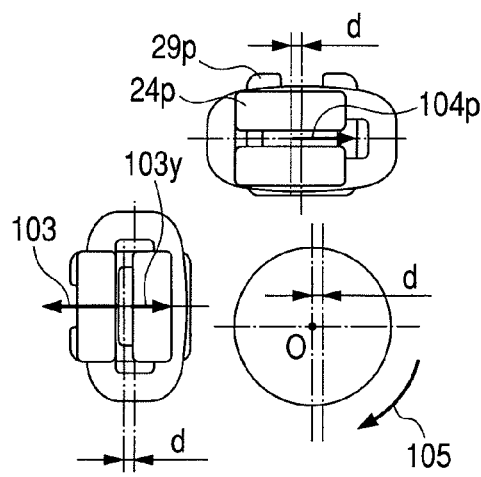
FIG. 9B is a view illustrating a relation of a force acting on a shift unit upon image blur correction.
Figure 9C:
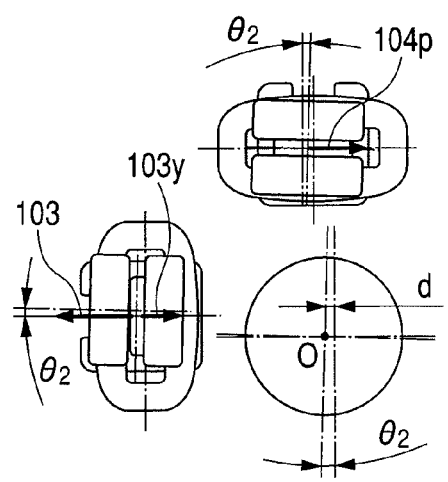
FIG. 9C is a view illustrating a balancing state of a rotational moment.

FIGS. 9A to 9C illustrates an example of prior art. In this example of prior art, the dimensional relation between the width A of the magnetic member 29p and the width B of the magnets for drive 24p is set to be as follows:

$$A = B.$$

Therefore, when the movable member is displaced in the yaw direction by the maximum amount, as illustrated in FIG. 9B, the magnets 24p are moved on the left side over the rear yoke 29p.

In focusing on the above-mentioned returning force, as illustrated in FIG. 9B, returning forces 104p and 103y, with which the magnets returns to their original positions with the attraction force, are generated. In comparison with the case where the magnets are not moved over the rear yoke as in this example, in the example of prior art, correspondingly to an amount, by which the magnets 24p are moved over the rear yoke 29p, due to the magnetic flux between the magnets 24p and the rear yoke 29p, the attraction force, which attracts the magnets 24p to the right direction in the drawing, increases. Therefore, the returning force 101p in this example illustrated in FIGS. 6A to 6C is lower than the returning force 104p in the example of prior art illustrated in FIGS. 9A to 9C.

Therefore, the rotational angle θ1 in this example illustrated in FIGS. 6A to 6C is lower than a rotational angle θ2 in the example of prior art illustrated in FIGS. 9A to 9C. As a result, rotation is restricted.

Though, in the foregoing, the description is made regarding displacement in the yaw direction, also for displacement in the pitch direction, its structure is the same as the structure for displacement in the yaw direction except that a direction for arrangement is shifted by 90°.

The width A of a direction orthogonal to a direction in which the movable member is driven by the magnetic members 29y and 29p is larger than the width B of a direction orthogonal to a direction in which the movable member is driven by the magnets for drive 24y and 24p. In this case, the magnetic members 29y and 29p constitute a horizontal driving portion (24y, 28y, and 29y) and a perpendicular driving portion (24p, 28p, and 29p), respectively.

In addition, the dimensional relation between the width A and the width B is not limited to the following relation:

$$A \geq (2 \times d + B).$$

For example, it is sufficient to determine the most suitable value complying with a target performance under consideration of a size and a cost under the setting of A>B including A>(d+B). For example, it is sufficient that A≥(d+B) is set.

Here, in order to arbitrarily move the position of the third group lens L3 despite rotation of the movable member 22 as illustrated in FIGS. 6A to 6C, the position of the third group lens L3 must be precisely detected even when the movable member 22 is rotated. For this reason, next, a relation between a rotational angle of the movable member 22 and output of the position detection unit is described.

Figure 7A:
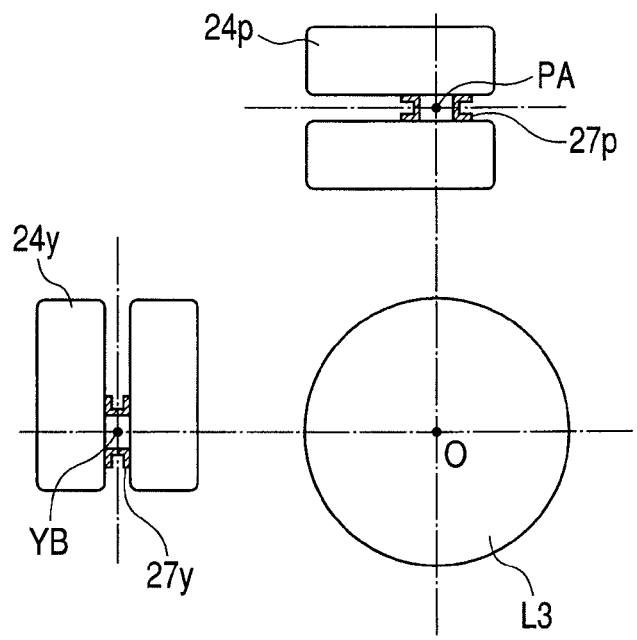
FIG. 7A is a diagram illustrating an arrangement of a hall sensor, magnets, and the image blur correction lens in the first example according to the present invention.

FIG. 7A illustrates an arrangement of the third group lens L3, the magnets 24, and the Hall elements 27p and 27y serving as the position detection unit when the movable member 22 is situated at the center position. The Hall element 27p in the pitch direction and the Hall element 27p in the yaw direction is arranged so that an intersection of a detecting direction axis is corresponding to the optical axis O. Further, component of the density of the magnetic flux in the optical axis direction due to the magnets 24p and 24y is detected, and hence the positions of the magnets can be detected in view of change of the density of the magnetic flux upon displacement in the driving direction.

Figure 7B:
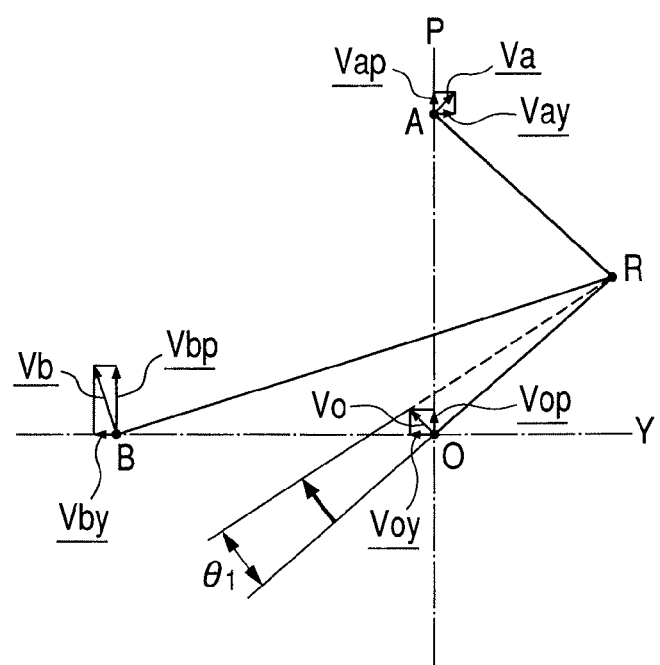
FIG. 7B is a diagram illustrating position detection when a movable member rotates.

FIG. 7B illustrates change of an output value from the Hall element when the movable member is rotated by an angle θ1 about an arbitrary point in a plane orthogonal to the optical axis. In FIG. 7B, it is supposed that a position detection point in the pitch direction is PA, and a position detection point in the yaw direction is YB. A center of the lens is indicated by O. The movable member is rotated about a point R. When a rotational angle θ1 is not so large, each of points PA, PB, and O is moved in a normal direction with respect to a straight line linking each of the points PA, PB, and O and the point R.

The above-mentioned movement of each of the points is indicated by Va, Vb, and Vo, respectively. The components which is resolved in one of the detection direction axis y of the yaw direction and the detection direction axis p of the pitch direction are indicated by Vap, Vay, Vbp, Vby, Vop, and Voy. In this case, the Hall element hardly has a sensibility against the flux bundle in the detecting direction and the perpendicular direction, and hence the components Vbp and Vay are not detected by the Hall element. In addition, the intersection of two detection direction axes p and y is corresponding to the optical axis O, and hence the following relation is obtained regarding the pitch component and the yaw component of the movement of the optical axis O:

$$Vop = Vap$$

$$Voy = Vby.$$

This fact indicates that it is possible to detect the amount of the movement about the lens without receiving the influence of rotation. It is possible to move the third group lens L3 to a precise position under control of positioning.

As described above, it is found that, when the rotational angle is not so large, it is possible to precisely detect the position of the third group lens L3 even when the movable member 22 rotates.

In the foregoing, the exemplary first example according to the present invention is described. In this example, the returning force is reduced, which is generated due to the attraction force acting on the magnet 24 and the rear yoke 29 on an opposite side with respect to the driving direction of the movable member 22. With this structure, the above-mentioned rotational moment 102 and the rotational angle θ1 are reduced. Thus, rotation in the plane orthogonal to the optical axis of the movable member is restricted.

As a result, the thrust force needed for position correction is reduced in position feed-back control of the movable member 22 without an additional mechanical mechanism. Thus, the electric power consumption may be reduced. Further, it is possible to obtain an image blur correction device excellent in micro-amplitude properties, a lens barrel provided with the image blur correction device, and an optical apparatus including the lens barrel.

Additionally, in this example, the returning force by the attraction force generated from the magnets for drive is reduced 24, and hence rotation of the correction lens in the plane orthogonal to the optical axis is easily restricted without one of an additional mechanical mechanism and an additional driving portion. In addition, rotation is restricted, and hence it is possible to reduce the electric power consumption needed for position feed-back control by rotation, and to obtain the image blur correction device excellent in micro-amplitude properties.

In this example, though the third group lens L3 supported by the movable member 22 is driven by two driving portions, that is, the driving portion for the yaw direction and the driving portion for the pitch direction, the present invention is applicable to an embodiment in which three driving portions are employed to drive the third group lens L3 supported by the movable member 22.

In this case, it is preferred that, in the plane orthogonal to the optical axis, about the optical axis, the three driving portions be arranged at an interval of 120°, and that three actuators arranged corresponding to the three driving portions be independently driven in order to correct an image blur due to vibration such as hand movements.

Note that, needless to say, the present invention is not limited to those examples, and various modifications and changes are possible within a range of the gist of the present invention.

Second Example

FIG. 8 is a schematic view of main parts of an imaging apparatus (camera) of a second example according to the present invention.

The imaging apparatus of the second example installs therein the lens barrel capable of correcting the image blur of the first example.

FIG. 8 illustrates a configuration of electrical processing for driving processing of each member in the camera installing therein the lens barrel of the first example. In FIG. 8, the components described in FIGS. 1 to 6 are indicated by the same symbols.

In the imaging apparatus (camera) in FIG. 8, a blur signal of the camera, which is detected by the pitch-direction-blurring sensor 59 and the yaw-direction-blurring sensor 60 (hereinafter, referred to as "sensors"), is input into the control circuit 56.

The control circuit 56 calculates a driving amount of the movable member for the image blur correction according to the signal from the sensors. Then, the control circuit 56 inputs the calculated driving amount into a third-lens-group driving source 31.

The third-lens-group driving source 31 energizes the coils for drive 28p and 28y according to the input signal. As a result, the movable member is moved so as to correct the image blur.

The stepping motor (hereinafter, referred to as zoom motor) 14 is a driving source of the second group lens L2. The voice coil motor 13 is a driving source of the fourth-group moving frame 4 holding the fourth group lens L4. The aperture motor (aperture-stop-device driving source) 12a is a driving source of the aperture-stop device 12. For the stop aperture, the galvanometer is used.

The photo interrupter 15 is the zoom reset switch for detecting whether or not the second-group moving frame 2 is positioned at the reference position in the optical axis direction. After detecting that the second-group moving frame 2 is positioned at the reference position, the number of pulse signals input into the stepping motor 14 is counted. Thus, it is possible to detect the amount of movement (position with respect to the reference position) of the second-group moving frame 2 in the optical axis direction.

The optical sensor 16 detects the absolute position of the fourth group lens L4 in the optical axis direction.

For the aperture-stop encoder 36, the following type is used. Specifically, in the type, the Hall element is arranged in the aperture-stop-device driving source 12a, and a rotational positional relation between the rotor and a stator is detected.

The control circuit 56 is responsible for the signal of the camera. The control circuit 56 includes a central processing unit (CPU). A camera signal processing circuit 50 performs signal processing such as predetermined augmentation and gamma correction with respect to output from the image pickup element 58.

A contrast signal of a picture signal processed as described above is supplied to an AE gate 52 and an auto focus (AF) gate 51. Each of the AE gate 52 and the AF gate 51 sets a picking-up range of the signal, which is optimum for exposure control and focusing, from the picture signal in an entire image surface. A size of the gate may be variable or alternatively multiple gates may be provided.

An AF signal processing circuit 53 processes the AF signal for the AF and generates at least one output about a high frequency component of the picture signal.

A zoom tracking memory 55 stores information of the position of the fourth-group moving frame 4 corresponding to a distance between the fourth-group moving frame 4 and the object to be taken and to a distance between the fourth-group moving frame 4 and the second-group moving frame 2 upon the variable magnification. Note that, for the zoom tracking memory 55, a memory in the control circuit 56 may be used.

For example, when the zoom switch 54 is operated by a user, the control circuit 56 maintain a predetermined positional relation between the second-group moving frame 2 and the fourth-group moving frame 4, the predetermined positional relation being calculated from information of the zoom tracking memory 55. That is, with the zoom switch 54, a count value, which indicates the current absolute position of the second-group moving frame 2 in the optical axis direction, and a calculated position to be set of the second-group moving frame 2 are corresponding to each other. Further, driving of the zoom motor 14 and the voice coil motor 13 is controlled by the zoom switch 54, and hence a count value, which indicates the current absolute position of the fourth-group moving frame 4 in the optical axis direction, and a calculated position to be set of the fourth-group moving frame 4 are corresponding to each other.

In addition, in auto focus operation, the control circuit 56 controls driving of the voice coil motor 13 so that output of the AF signal processing circuit 53 exhibits a peak.

Further, in order to obtain suitable exposure, the control circuit 56 sets an average value of output of a Y signal, which passes by the AF gate 52, as a referential value, controls driving of the aperture motor 12a so that output of the aperture-stop encoder 36 is the referential value, and controls the amount of light.

The control circuit 56 controls energizing to each of the coils 28y and 28p serving as a component of the third-group-lens driving source 31 based on a signal from the output sensor 29 (Hall element 29y, 29p) from the blurring sensors 59 and 60. In this manner, the movable member holding the third group lens L3 is driven so as to correct the image blur.

In the examples described above, the imaging apparatus in which the lens barrel is integrally provided to a main body of the camera is described. The lens barrel according to the present invention is also applicable to an interchangeable lens device detachable to the main body of the camera. Alternatively, the lens barrel according to the present invention is also applicable to a silver film camera, the digital still camera, and the video camera. The function for vibration isolation according to the present invention is also applicable to an optical apparatus such as an observation instrument including binoculars.

Third Example

Figure 10:
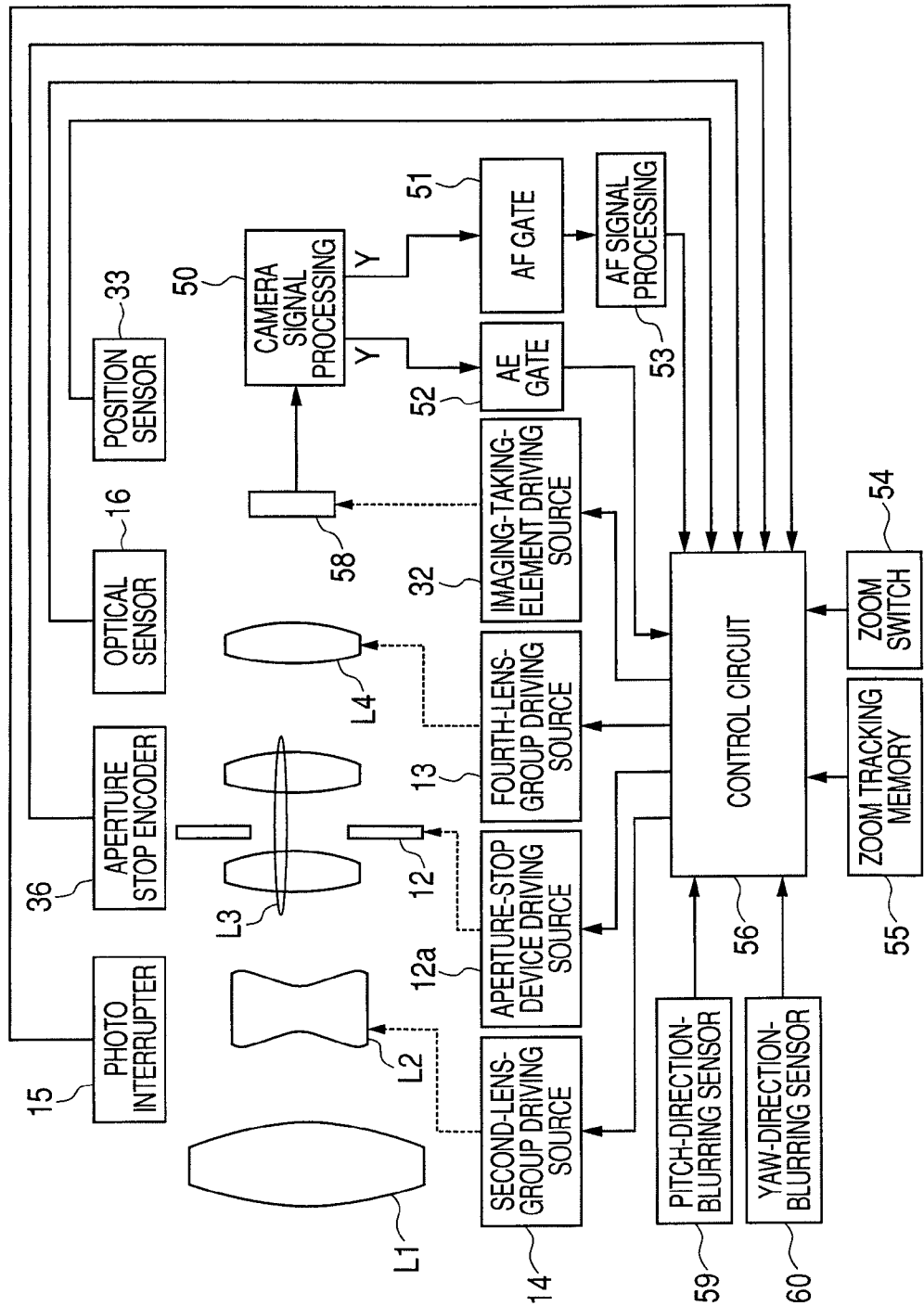
FIG. 10 is a block diagram illustrating a structure of an electric circuit of a camera installing therein an image blur correction device driving an image pickup element in a third example according to the present invention.

FIG. 10 is a block diagram of main parts of a third example when the image pickup element 58 is moved for image blur correction in replace of the movement of the movable member holding the third group lens L3 of FIG. 8.

A basic structure of the image blur correction device is the same as that of the first example. Except for image blur correction in which the image pickup element 58 is moved for image blur correction in replace of the third group lens L3, the electrical configuration is the same as that of the second example.

In FIG. 10, the image pickup element 58 includes one of a CCD and a CMOS, and is driven by an image-pickup-element driving source 32.

The blurring sensors 50 and 60 detect the blur in the pitch direction and the yaw direction. The control circuit 56 controls energizing to the coil serving as a component of the image-pickup-element driving source 32 according to output from the blur sensors 59 and 60 and the signal from the position sensor 33. Thus, the image pickup element 58 is driven so as to correct the image blur.

Note that, a structure of the driving portion of each of the above-mentioned examples is not limited to the image blur correction device, and such structure is applicable to a driving apparatus for moving a member in a horizontal direction and a perpendicular direction.

Fourth Example

In the first example, in the magnetic circuit of FIG. 5, the example in a so-called moving magnet type actuator in which the front yoke 23*p* and the magnets 24*p* are movable and the coil 28*p* and the rear yoke 29*p* are fixed. Here, in the magnetic circuit of FIG. 5, as a variant, an example in the moving coil type actuator is described, in which the front yoke 23*p* and the magnets 24*p* are fixed and the coil 28*p* and the rear yoke 29*p* are movable.

A basic mechanic structure of the shift unit 3 is similar to that of the first example, and the detailed description thereof is omitted. What is significantly different is that the coil 28*p* and the rear yoke 29*p* are configured to be movable integrally with the shift moving frame 22, and that the front yoke 23*p* and the magnets 24*p* are retained by the fixed shift base 21.

By energizing the coil, the coil and the rear yoke are actuated integrally with each other in the fourth example, while the magnets are actuated in the first example. An action/effect to be obtained is the same as that of the first example. Specifically, the shift moving frame 22 can be freely moved within a predetermined range in the plane orthogonal to the optical axis.

Figure 11A:
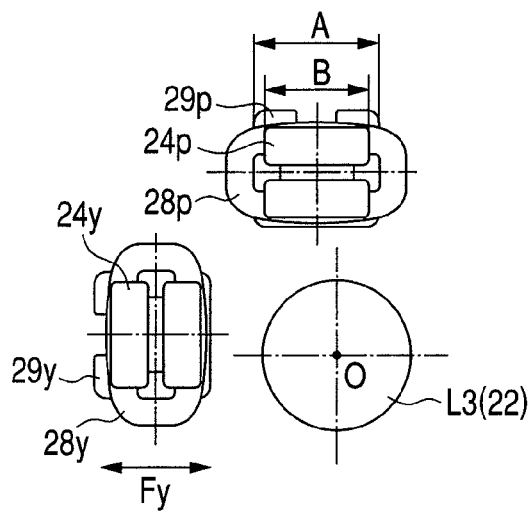
FIG. 11A is a view illustrating an arrangement of an image blur correction lens and the driving portion in a center position, in a fourth example according to the present invention.
Figure 11B:
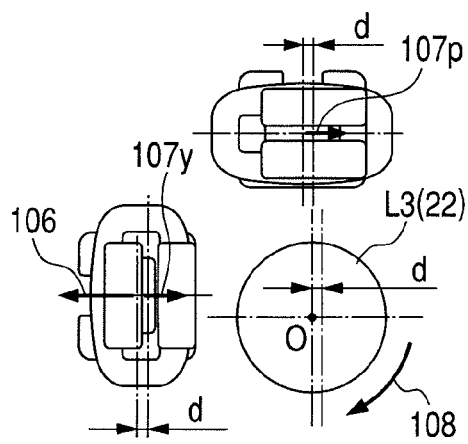
FIG. 11B is a view illustrating a relation of a force acting on the shift unit upon image blur correction.
Figure 11C:
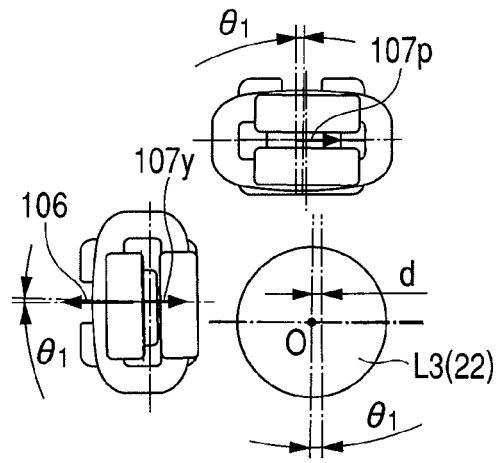
FIG. 11C is a view illustrating a balancing state of a rotational moment.

FIGS. 11A to 11C illustrate, similarly to FIGS. 6A to 6C of the first example, a relation of movement of the movable member (shift moving frame) 22 and rotation by the returning force due to the attraction force in this example.

FIG. 11A illustrates arrangement of the magnets 24 (24*p* and 24*y*) on the fixing side in a state in which the third group lens L3 supported by the movable member 22, the coils 28 (28*p* and 28*y*), and the rear yokes 29 (29*p* and 29*y*) are situated at the center position.

Note that, the magnets 24*p*, the coil 28*p*, and the rear yoke 29*p* constitute a perpendicular driving portion for moving the movable member in the perpendicular direction Fp.

In addition, the magnets 24*y*, the coil 28*y*, and the rear yoke 29*y* constitute a horizontal driving portion for moving the movable member in the horizontal direction Fy.

FIG. 11B illustrates a relation of a driving force and an attraction force when the movable member 22 is displaced in the yaw direction (left direction in the drawing) from the state of FIG. 11A. When the movable member 22 is displaced in the yaw direction, by supplying an electrical current to the coil 28*y*, a Lorentz force is generated from the coil 28*y*. Due to the Lorentz force, a thrust force 106 for driving the movable member 22 in the yaw direction is generated. Due to the thrust force 106, the movable member 22 is moved by a distance d.

In this case, the rear yokes 29 (29*p* and 29*y*) arranged in the movable member 22 are also moved by the distance d from the center position of the driving portion. Thus, returning forces 107*p* and 107*y* for returning to their original positions with the attraction force with the magnets 24 are generated.

Upon the above-mentioned action, the thrust force 106 and the returning force 107*y* act on the identical axis to an axis of a thrust force direction, while the returning force 107*p* acting on the driving portion in the pitch direction is not on the identical axis to the thrust force 106. Thus, a rotational moment 108 for rotating the movable member with the thrust force 106 and the returning force 107*p* is generated.

FIG. 11C illustrates a state in which the rotational moment due to the thrust force 106 and the returning force 107*p* of FIG. 11B is balanced. The center point O of the third group lens L3 is moved from the optical axis in the yaw direction by the distance d, and the movable member 22 is rotated by a rotational angle θ1 in the plane orthogonal to the optical axis. In this case, a rotational direction in the plane orthogonal to the optical axis is in a stable state because the thrust force 106 and the returning force 107*p* are balanced. Thus, even when an additional force in the rotational direction acts, the force for returning to the position of the rotational angle θ1 is generated.

In FIG. 11A, a reference symbol A indicates a longitudinal dimension of the rear yoke (magnetic member) 29*p*, and a reference symbol B indicates a longitudinal dimension of the magnets 24*p*. In this example, supposed that the distance d is a maximum movable distance of the movable member 22 in one direction from the optical axis, a dimensional relation between the width A of the magnetic member 29*p* and the width B of the magnets for drive 24*p* is set as follows:

$$A \geq (2 \times d + B).$$

That is, the width A (mm) is set to be larger than the width B (mm).

With this setting, even when the movable member 22 is displaced in the yaw direction by the maximum amount, as illustrated in FIG. 11B, the magnets 24*p* are not moved on a left side over the rear yoke 29*p*.

Here, in the case where A=B is set as in the example of prior art of FIGS. 9A to 9C, when the movable member is displaced by the maximum amount in the yaw direction, that is, to the left side in the drawing, the rear yoke 29*p* is moved to the left side over the magnets 24*p*.

In focusing on the above-mentioned returning force, in comparison with the case where the rear yoke is not moved over the magnets as in this example, correspondingly to an amount, by which the rear yoke 29*p* is moved over the magnets 24*p*, due to the magnetic flux between the rear yoke 29*p* and the magnets 24*p*, the returning force for attracting the rear yoke 29*p* to the right direction in the drawing increases. Therefore, the returning force 110*p* in this example illustrated in FIGS. 11A to 11C is lower than the returning force in the example of prior art.

Therefore, the rotational angle θ1 in this example illustrated in FIGS. 11A to 11C is lower than a rotational angle in the example of prior art. As a result, rotation is restricted.

Though, in the foregoing, the description is made regarding displacement in the yaw direction, also for displacement in the pitch direction, its structure is the same as the structure for displacement in the yaw direction except that a direction for arrangement is shifted by 90°.

The width A of a direction orthogonal to a direction in which the movable member is driven by the magnetic members 29y and 29p is larger than the width B of a direction orthogonal to a direction in which the movable member is driven by the magnets for drive 24y and 24p. In this case, the magnetic members 29y and 29p constitute a horizontal driving portion (24y, 28y, and 29y) and a perpendicular driving portion (24p, 28p, and 29p), respectively.

In addition, the dimensional relation between the width A and the width B is not limited to the following relation:

$$A \geq (2 \times d + B).$$

For example, it is sufficient to determine the most suitable value complying with a target performance under consideration of a size and a cost under the setting of A>B including A>(d+B). For example, it is sufficient that A≥(d+B) is set.

A relation of a rotational angle of the movable member 22 and an output of the position detecting means is the same as that of the first example.

In the foregoing, the exemplary fourth example according to the present invention is described. In this example, the returning force is reduced, which is generated due to the attraction force acting on the magnet 24 and the rear yoke 29 on an opposite side with respect to the driving direction of the movable member 22. With this structure, the above-mentioned rotational moment 108 and the rotational angle θ1 are reduced. Thus, rotation in the plane orthogonal to the optical axis of the movable member is restricted.

As a result, the thrust force needed for position correction is reduced in position feed-back control of the movable member 22 without an additional mechanical mechanism. Thus, the electric power consumption may be also reduced. Further, it is possible to obtain an image blur correction device excellent in micro-amplitude properties, a lens barrel provided with the image blur correction device, and an optical apparatus including the lens barrel.

Additionally, in this example, the returning force by the attraction force generated from the magnets for drive is reduced, and hence rotation of the correction lens in the plane orthogonal to the optical axis is easily restricted without one of an additional mechanical mechanism and an additional driving portion. In addition, rotation is restricted, and hence it is possible to reduce the electric power consumption needed for position feed-back control by rotation, and to obtain the image blur correction device excellent in micro-amplitude properties.

In this example, though the third group lens L3 supported by the movable member 22 is driven by two driving portions, that is, the driving portion for the yaw direction and the driving portion for the pitch direction, the present invention is applicable to an embodiment in which three driving portions are employed to drive the third group lens L3 supported by the movable member 22.

In this case, it is preferred that, in the plane orthogonal to the optical axis, about the optical axis, the three driving portions be arranged at an interval of 120°, and that three actuators arranged corresponding to the three driving portions be independently driven in order to correct an image blur due to vibration such as hand movements.

Note that, needless to say, the present invention is not limited to those examples, and various modifications and changes are possible within a range of the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-010536, filed Jan. 21, 2009, which is hereby incorporated by reference herein in its entirety.

What is claimed is:

1. A lens barrel having an image blur correction function for correcting an image blur, the lens barrel comprising:
   a driving portion comprising a driving magnet, a driving coil, and a magnetic member;
   a movable member movable in a direction orthogonal to an optical axis while holding a lens and the driving magnet; and
   a fixed member that positions the movable member in an optical axis direction and holds the driving coil and the magnetic member,
   wherein the driving portion moves the movable member in the direction orthogonal to the optical axis, and
   wherein, in a plane orthogonal to the optical axis, a width of the magnetic member in a direction orthogonal to a direction of driving the movable member is larger than a width of the driving magnet in the direction orthogonal to the direction of driving the movable member.

2. A lens barrel according to claim 1, wherein:
   the driving portion comprises:
   a first driving portion that drives the movable member in the plane orthogonal to the optical axis in a first direction; and
   a second driving portion that drives the movable member in the plane orthogonal to the optical axis in a second direction orthogonal to the first direction, and
   in the plane orthogonal to the optical axis, the width of the magnetic member in the direction orthogonal to the direction of driving the movable member constituting each of the first driving portion and the second driving portion is larger than the width of the driving magnet in the direction orthogonal to the direction of driving the movable member.

3. A lens barrel according to claim 1, wherein the relation A≥(2×d+B) is satisfied, where d (mm) represents a maximum movable distance of the movable member, A (mm) represents the width of the magnetic member in the direction orthogonal to the direction of driving the movable member, and B (mm) represents the width of the driving magnet in the direction orthogonal to the direction of driving the movable member.

4. An optical apparatus comprising:
   an image pickup element; and
   a lens barrel having an image blur correction function for correcting an image blur,
   wherein the lens barrel comprises:
   a driving portion comprising a driving magnet, a driving coil, and a magnetic member;
   a movable member movable in a direction orthogonal to an optical axis while holding a lens and the driving magnet; and
   a fixed member that positions the movable member in an optical axis direction and holds the driving coil and the magnetic member, wherein the driving portion moves the movable member in the direction orthogonal to the optical axis, and wherein, in a plane orthogonal to the optical axis, a width of the magnetic member in a direction orthogonal to a direction of driving the movable member is larger than a width of the driving magnet in the direction orthogonal to the direction of driving the movable member.

5. A lens barrel having an image blur correction function for correcting an image blur, the lens barrel comprising:

a driving portion comprising a driving magnet, a driving coil, and a magnetic member;

a movable member movable in a direction orthogonal to an optical axis while holding a lens, the driving coil, and the magnetic member; and a fixed member that positions the movable member in an optical axis direction and holding the driving magnet, wherein the driving portion moves the movable member in the direction orthogonal to the optical axis, and wherein, in a plane orthogonal to the optical axis, a width of the magnetic member in a direction orthogonal to a direction of driving the movable member is larger than a width of the driving magnet in the direction orthogonal to the direction of driving the movable member.

6. A lens barrel according to claim 5, wherein:

the driving portion further comprises:

a first driving portion that drives the movable member in the plane orthogonal to the optical axis in a first direction; and a second driving portion that drives the movable member in the plane orthogonal to the optical axis in a second direction orthogonal to the first direction, in the plane orthogonal to the optical axis, the width of the magnet member in the direction orthogonal to the direction of driving the movable member constituting each of the first driving portion and the second driving portion is larger than the width of the driving magnetic in the direction orthogonal to the direction of driving the movable member.

7. A lens barrel according to claim 5, wherein the relation $A \geq (2 \times d + B)$ is satisfied, where d (mm) represents a maximum movable distance of the movable member, A (mm) represents the width of the magnetic member in the direction orthogonal to the direction of driving the movable member, and B (mm) represents the width of the driving magnet in the direction orthogonal to the direction of driving the movable member.

8. An optical apparatus comprising:

an image pickup element; and a lens barrel having an image blur correction function for correcting an image blur, wherein the lens barrel comprises:

a driving portion comprising a driving magnet, a driving coil, and a magnetic member;

a movable member movable in a direction orthogonal to an optical axis while holding a lens, the driving coil, and the magnetic member; and a fixed member that positions the movable member in an optical axis direction and holding the driving magnet, wherein the driving portion moves the movable member in the direction orthogonal to the optical axis, and wherein, in a plane orthogonal to the optical axis, a width of the magnetic member in a direction orthogonal to a direction of driving the movable member is larger than a width of the driving magnet in the direction orthogonal to the direction of driving the movable member.

* * * * *